US006993283B1

(12) United States Patent
Ka Ming et al.

(10) Patent No.: US 6,993,283 B1
(45) Date of Patent: Jan. 31, 2006

(54) WIRELESS AUDIO TRANSMISSION SYSTEM (75) Inventors: Wu Ka Ming, Hongkong (HK); So Yan Kwan, Hongkong (HK)

(73) Assignee: Nasaco Electronics (Hong Kong) Ltd., (HK)

( * ) Notice: Subject to any disclaimer, the term of this patent is extended or adjusted under 35 U.S.C. 154(b) by 860 days.

(21) Appl. No.: 09/905,815

(22) Filed: Jul. 16, 2001

(51) Int. Cl.
*H04H 1/00* (2006.01)

(52) U.S. Cl. ............... 455/3.01; 455/507; 375/240.02; 725/18; 725/62

(58) Field of Classification Search .............. 455/3.01, 455/507; 725/18, 62; 375/240.02
See application file for complete search history.

(56) References Cited

U.S. PATENT DOCUMENTS

| 5,272,525 A | 12/1993 | Borchardt et al. ......... 348/729 |
| 5,410,735 A | 4/1995 | Borchardt et al. ............ 455/42 |
| 5,666,658 A | 9/1997 | Borchardt et al. ............ 455/42 |
| 5,832,024 A | 11/1998 | Schotz et al. ............... 375/134 |
| 5,845,083 A | 12/1998 | Hamadani et al. .......... 370/316 |
| 6,201,797 B1 | 3/2001 | Leuca et al. ................. 370/316 |
| 6,212,359 B1 | 4/2001 | Knox .......................... 725/135 |
| 6,240,210 B1 * | 5/2001 | Koyama ..................... 382/233 |
| 2003/0007556 A1 * | 1/2003 | Oura et al. |

\* cited by examiner

*Primary Examiner*—Harry S. Hong
*Assistant Examiner*—Quynh H. Nguyen
(74) *Attorney, Agent, or Firm*—George O. Saile; Stephen B. Ackerman; Billy Knowles (57) ABSTRACT

A wireless transmission and reception system to convey analog signals within a local transmission area. The wireless transmission system includes a first encoder to receive an analog signal, to digitize the analog signal, and to compress the digitized analog signal using MP-3 compression; a modulator to modulate a carrier signal with the compressed digitized analog signal; and a transmitter for wireless transference of the modulated RF carrier. The reception system has a receiver to acquire the modulated carrier signal; demodulator to extract the compressed digitized analog signal from the modulated carrier signal; and a first decoder to decompress the compressed digitized analog signal using MP-3 decompression and to convert the digitized analog signal to a reproduction of the analog signal.

25 Claims, 6 Drawing Sheets

WIRELESS AUDIO TRANSMISSION SYSTEM

BACKGROUND OF THE INVENTION

1. Field of the Invention

This invention relates generally to the transmitting and receiving of analog signals wirelessly through the atmosphere. More particularly, the present invention relates to digitizing the analog signals, compressing the digitized analog signals according to the Moving Pictures Experts Group (MPEG) layer 3 algorithm, wirelessly transmitting and receiving the compressed, digitized analog signals, and restoring the compressed, digitized analog signal to reproduce the analog signals.

2. Description of Related Art

The wireless transmission of analog signals such as audio signals is well known in the art. Current commercially available devices such as cordless telephones and cellular telephones are examples of the wireless transmission and reception of audio frequency analog signals. U.S. Pat. No. 5,832,024 (Schotz et al.) illustrates the wireless transfer of audio frequency analog signals created by devices such as an AM/FM tuner to speakers. This wireless transfer is generally accomplished by modulating a radio frequency (RF) carrier signal with the analog signal.

The Federal Communication Commission (FCC) of the United States (U.S.) government strictly regulates the conditions at which information can be transmitted into the atmosphere. The FCC has allocated under 47 CFR§ 15.249 certain RF bands above 900 Mhz to be unlicensed. These bands generally require transmission of RF signals having less than 1 mW of power for signals with conventional modulation and 1W of power for spread spectrum modulation. U.S. Pat. No. 5,272,525, U.S. Pat. No. 5,410,735, and U.S. Pat. No. 5,666,658, all to Borchardt et al., describe wireless audio systems that operate at frequencies greater than 900 MHz. U.S. Pat. No. 6,212,359 (Knox) describes a transmission system that receives digitized music from a receiver tuner employing the RF frequencies greater than 900 MHz.

The algorithms defined by the MPEG for the compression of digitized analog signals are published as ISO/IEC11172 and ISO/IEC 13818. The algorithm published under ISO/IEC11172 is commonly referred to as MPEG-1 layer 3 and the algorithm published under ISO/IEC 13818 is referred to as MPEG-2 Advanced Audio Coding (MC). These algorithms will be referred to as hereinafter as MP-3 and encompass these and any derivative algorithms as developed under the auspices of the MPEG.

For the MP-3 compression of a digitized analog signal, the analog signal is sampled at a frequency of 44.1 kHz. Each sample has 16 bits. Without compression, one second of a stereo audio signal requires more than 1.4M bits of data. The MP-3 algorithm allows compression of the data by a factor 12 for stereo audio having a bandwidth greater than 15 KHz to a factor of 96 for telephone quality audio having a bandwidth about 2.5 KHz.

The MP3 is an open standard having many versions of programs that implement the standard. Further, there are also digital signal processors and microconntrollers that provide economical hardware to execute the programs that implement the algorithms. As the demand for less expensive and more consumer oriented audio systems increased, application specific integrated circuits (ASIC's) were developed to implement the algorithms of the MP3 specifications. Originally, the MP3 standards were intended for use mainly with video coding for digital storage media. However, presently the MP3 standards are used in digital audio broadcasting, telephonic transmission for distribution of broadcast content, archival storage within broadcasting systems, sound for digital television, internet streaming of audio signals (music), for use within portable audio devices containing stored audio content for replay, and for storage and exchange of digitized music files on computers. Each of these applications either store or retain the compressed, digitized analog signals on a storage medium (semiconductor memory or magnetic or optical storage media) or for use in broadcast of the audio signals to a wide area for use by a general population.

SUMMARY OF THE INVENTION

An object of this invention is to provide a wireless transmission system to convey analog signals.

Another object of this invention is to provide a wireless reception system to accept wireless RF transmissions of analog signals.

Further another object of this invention is the wireless transmission and reception of analog signals within a local transmission area.

To accomplish at least one of these objects, a wireless audio transmission system includes a first encoder to receive an analog signal, to digitize the analog signal, and to compress the digitized analog signal using MP-3 compression algorithm. The MP-3 compression algorithm provides a compression ratio of the digitized analog signal to the compressed digitized analog signal that is from approximately 8:1 to approximately 96:1 and is determined by a quality of audio reproduction of the analog signal.

A modulator is in communication with the first encoder to receive the compressed digitized analog signal and to modulate a carrier signal with the compressed digitized analog signal. The modulated carrier signal is transferred to a transmitter for wireless transference. The carrier signal of this invention has a frequency that is greater than 900 MHz within the RF bands designated by the FCC for nonlicensed communication.

A receiver acquires the modulated carrier signal and transfers it to a demodulator. The demodulator extracts the compressed digitized analog signal from the modulated carrier signal. The extracted compressed digitized analog signal is transferred to a first decoder in communication with the demodulator. The first decoder decompresses the compressed digitized analog signal using an MP-3 decompression algorithm and converts the digitized analog signal to a reproduction of the analog signal.

The transmission may further include a frame formatter in communication between the first encoder and the modulator to divide the compressed digitized analog signal into frames. Each frame is composed of multiple packets, with synchronization patterns placed at a beginning of each packet. An end-of-frame pattern at an end of each frame to demarcate the frame.

There may be insufficient transitions between voltage levels of the compressed digitized analog signal that contribute to errors in receiving the compressed digitized analog signal. To compensate for the insufficient transitions, transmission system may have a bit-stuffing circuit. The bit-stuffing circuit in communication between the frame formatter and the modulator inserts bits into any frame having insufficient transitions. To have a proper number of transitions within a packet a 7 to 1 bit-stuffing ratio is employed.

For transmission of the compressed digitized analog signal, the compressed digitized analog signal is further encoded to a non-return-to-zero invert-or-zeros (NRZI) in a second encoder. The second encoder is optionally placed to in communication between the first encoder and the modulator to perform the NRZI encoding.

If the transmission system employs an NRZI coding, the transmission system further comprises a second decoder placed in communication between the demodulator and the first decoder. The second decoder restores the NRZI encoded, compressed digitized analog signal to remove the NRZI coding from the compressed digitized analog signal. Additionally, if the compressed digitized analog signal has had extra bits stuffed into the compressed digitized analog signal to compensate for the insufficient transitions, the transmission system has a bit-extractor circuit in communication between the second decoder and the first decoder. The bit-extractor removes all bits inserted into the compressed digitized analog signal to restore original transitions of the compressed digitized analog signal.

If the compressed digitized analog signal is divided into frames, the transmission system further incorporates a frame remover in communication between the demodulator and the first decoder. The frame remover removes synchronization patterns from a beginning of each packet of the compressed digitized analog signals and end-of-frame patterns from the end of each frame of the compressed digitized analog signals.

DETAILED DESCRIPTION OF THE INVENTION

As described above, MP-3 encoders and decoders are implemented commercially as digital signal processor, microcontrollers, or microprocessors programmed to receive a digitized analog signal such an audio signal created from a sound impacting on a microphone. Alternately, the ASIC MP-3 encoders and decoders are available to provide economical solutions for providing MP-3 encoding and decoding.

Figure 1:
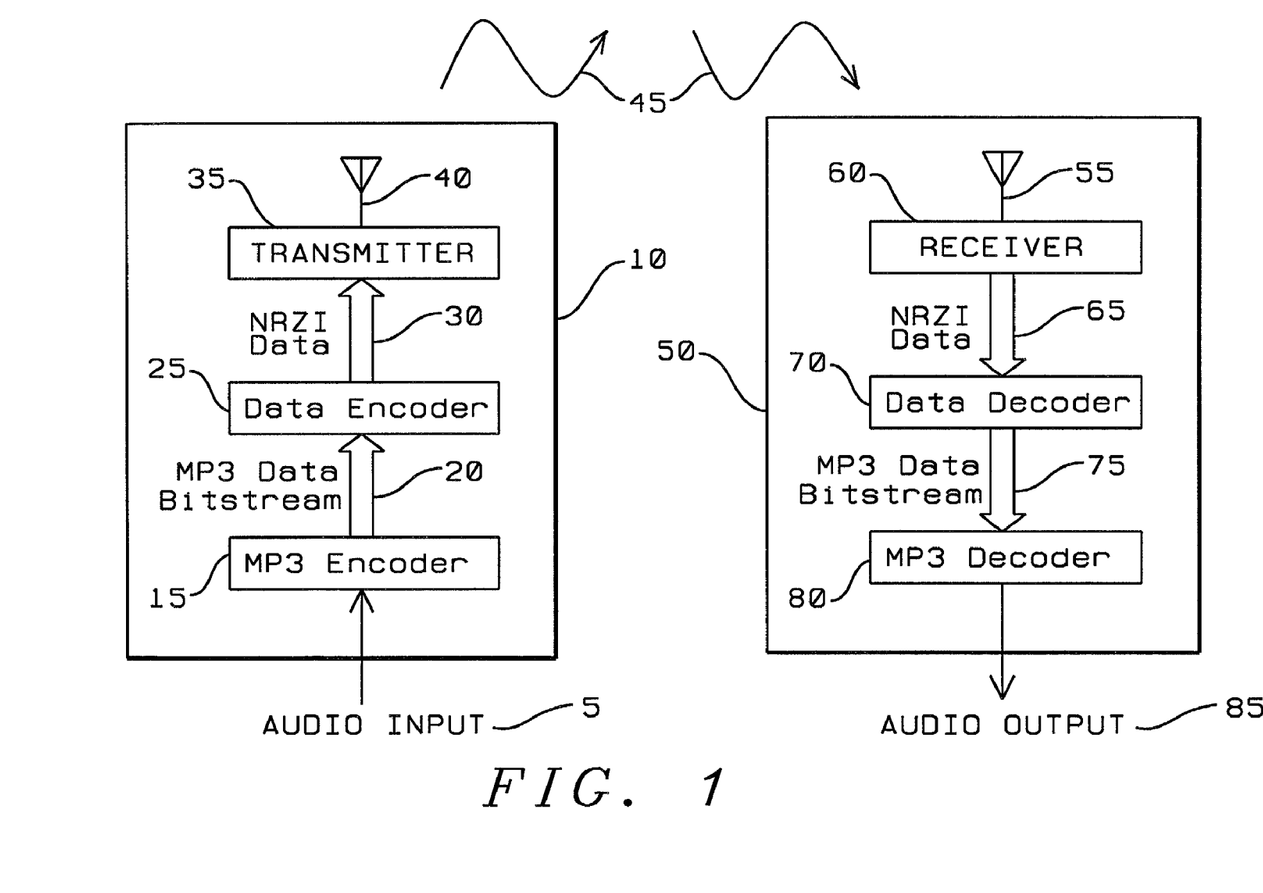
FIG. 1 is a block diagram of an analog transmission system of this invention.

Refer now to FIG. 1 for a description of an analog audio signal transmission system of this invention. An audio input 5 is connected to a transmitter sub-system 10. The transmitter sub-system 10 transfers a modulated RF carrier signal by way of electromagnetic waves 45 to the receiver sub-system 50. The receiver sub-system 50 extracts and reproduces the audio signal, which is conveyed to an audio output 85.

The transmitter sub-system 10 has an MP-3 encoder 15, which receives the analog input signal. The MP-3 encoder includes an analog-to-digital converter that samples the analog input signal at a sampling rate of 44.1 kHz. The sampled analog signal is then digitized to describe the voltage levels of the analog signal at the sampling points. The MP-3 encoder then compresses the sampled, digitized analog signal according to the MP-3 compression algorithm as described above.

Figure 2:
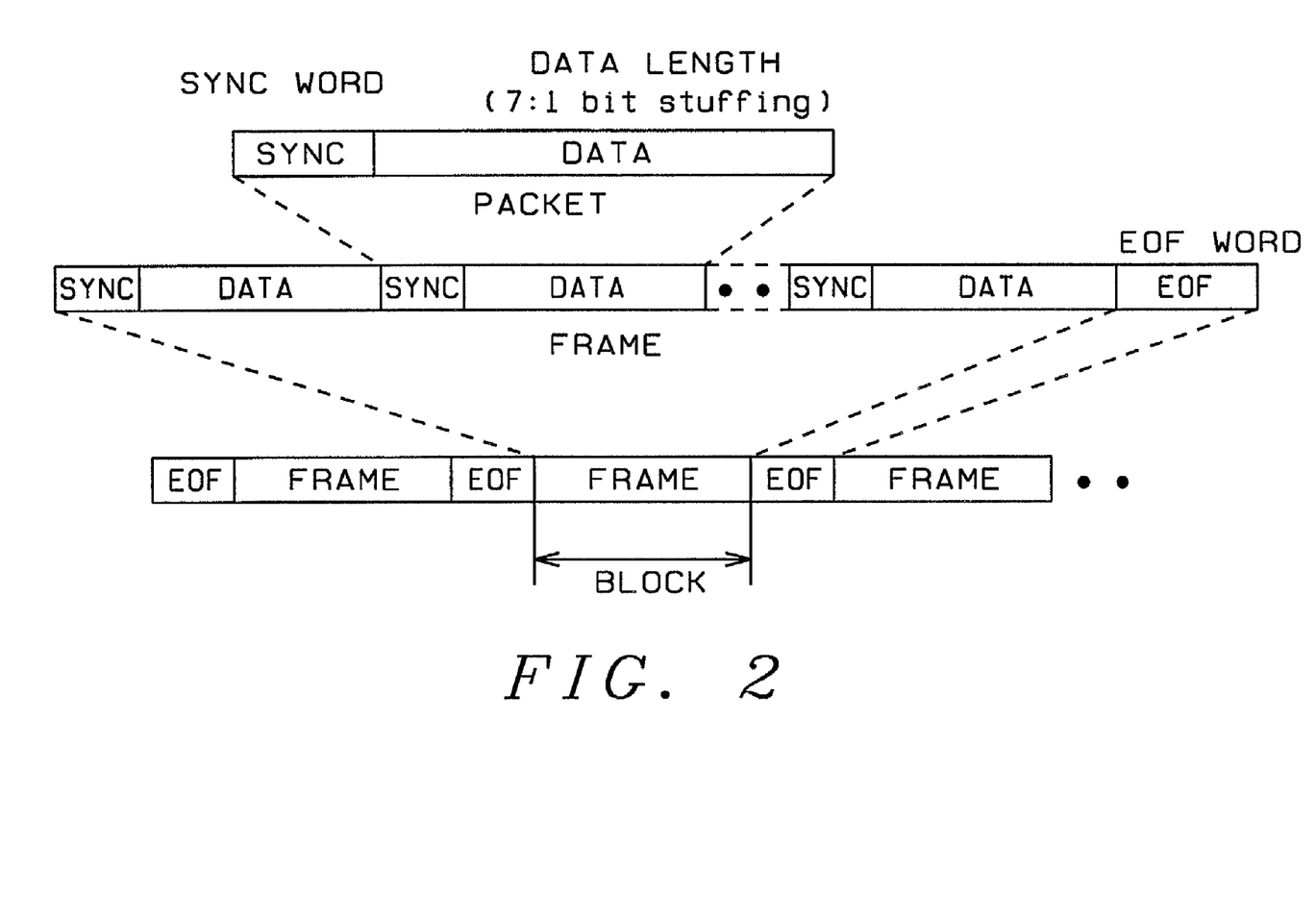
FIG. 2 is a diagram of the packet and frame structure of the compressed digitized analog signal of this invention.

The compressed digitized analog signal 20 may be transferred directly to the transmitter 35 for transmission to the receiver sub-system 50 or preferentially sent to a second data encoder 25. The second data encoder 25 includes a frame formatter that divides the compressed digitized analog signal into packets as shown in FIG. 2. Each packet has a synchronization pattern word (0000 0001) appended to the beginning of each packet. Sixteen packets are grouped together into a frame. Each frame is demarcated by an end-of-frame pattern word.

Figure 7:
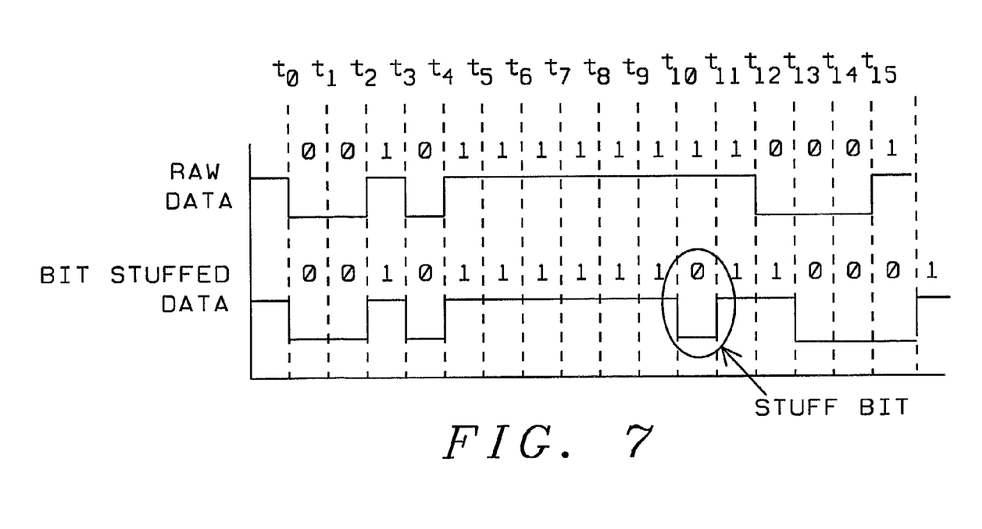

If a frame of the compressed digitized analog signal does not contain sufficient transitions, the receiver sub-system 50 may not be able to recover the transmitted compressed digitized analog signal correctly. Referring to FIG. 7, the compressed digitized analog signal has a series of data bits all at one level (1) from the time $t_4$ to the time $t_{12}$. This period of time causes the frequency content of the compressed digitized audio signal to deviate improperly from that required to ensure correct reception by the receiver 50 of FIG. 1. To cause the frequency content to be essentially correct, a bit of the first logic level (0) is inserted (stuffed) between the time $t_{10}$ and time $t_{11}$. The stuffed bit does not effect the information content of the compressed digitized analog signal.

To ensure a proper number of transitions within each frame of the compressed digitized analog signal, the second data encoder contains a bit-stuffer circuit to ensure that a proper number of transitions occur in the transmitted signal. In the case of the preferred embodiment, a series of bits containing a number of a particular logic level, in this case, six consecutive ones must be followed by a transition to the opposite logic level (a zero). The bit-stuffer processes each frame of the compressed digitized analog signal and places the necessary bits according to the number of consecutive logic levels in the compressed digitized analog signal.

Figure 6:
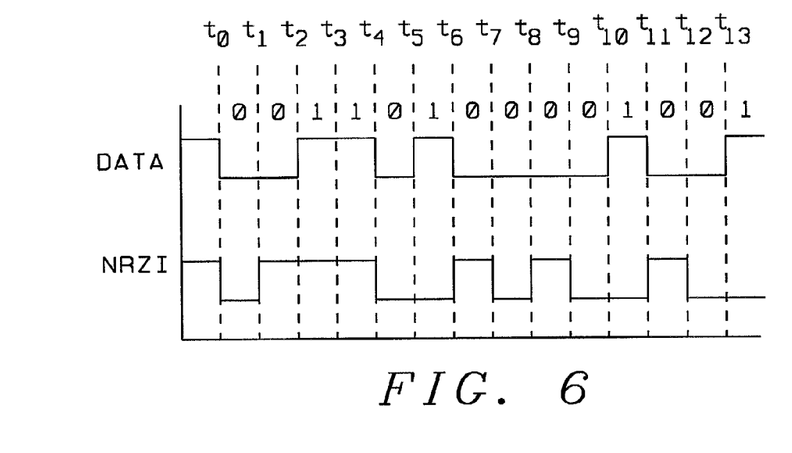
FIGS. 6 and 7 are plots of the construction of the NRZI data encoding and for the bit-stuffing for insufficient transitions of this invention.

Standard formatting of the digitized analog signal is termed Non Return-to-Zero (NRZ) indicating that the voltage level of the digitized analog signal changes at each period or clock of the system. In communication systems, it has been found that coding of the digitized analog signal such as Non-Return-to-Zero Invert-on-Zeros (NRZI), as shown in FIG. 6, is less prone to error conditions in the recovery of the digitized analog signal, while requiring less bandwidth. The NRZI code is based on the voltage level of the previous bit and the current bit. If the previous bit is a first voltage level (0), and the current bit is a second logic level (1) the encoded data remains at the logic level of the previous encoded bit as shown at times $t_2$ $t_5$, $t_{10}$, and $t_{13}$. If the previous bit is the first voltage level (0) and the current bit is also the first logic level (0), the encoded data inverts or changes to the opposite logic level of the previous encoded bit as shown at times $t_1$ $t_7$, $t_9$, and $t_{12}$. If the previous bit is the second voltage level (1) and the current bit is also the second logic level (1), the encoded data remains at the logic level of the previous encoded bit as shown at time $t_3$. And, if the previous bit is the second voltage level (1) and the current bit is the first logic level (0), the encoded data inverts or changes to the opposite logic level of the previous encoded bit as shown at times $t_4$ $t_6$, and $t_{11}$.

The synchronization pattern at the beginning of each packet allows a clocking pulse that allows the receiver sub-system 50 to detect the boundary of each packet. The end-of-frame pattern at the end of each frame generates a unique pattern to allow the receiver sub-system 50 to demarcate each frame.

Returning to FIG. 1, the data encoder has an NRZI coding circuit to convert the compressed digitized analog signal to an NRZI coded data 30. The NRZI coded data 30 is conveyed to the transmitter 35. The transmitter includes a modulator that combines the compressed digitized analog signal (either NRZI encoded or not encoded) with an RF carrier signal using common frequency shift keying (FSK). The RF carrier signal has a frequency that is in the unlicensed bands greater than 900 MHz. Other common modulation methods such as amplitude modulation (AM) and phase modulation (PM) maybe used. Alternatively, more complex modulation techniques such as spread spectrum modulation or quadrature phase shift keying maybe employed and still be in keeping with this invention.

The modulated RF carrier signal is transferred to a transmitter driver that drives the antenna 40 that induces an electromagnetic wave 45 to the atmosphere. The electromagnetic wave 50 is received at the antenna 55 of the receiver sub-system 50.

The receiver sub-system 50 has a receiver 60 that recovers the modulated RF carrier signal induced to the antenna 55 by the electromagnetic wave 45. The receiver 60 has a receiving amplifier to recover and amplify the modulated RF carrier signal. The recovered RF carrier signal is applied to a demodulator within the receiver to extract the compressed digitized analog signal, either NRZI encoded or standard NRZ coded. If the compressed digitized analog signal is NRZ coded, as opposed to the NRZI coding, the compressed analog signal is transferred to the MP-3 decoder 80 and the analog signal decompressed to reproduce the original digitized analog signal. The reproduced digitized analog signal is transferred to a digital-to-analog converter to reproduce the analog signal.

If the extracted compressed digitized analog signal is NRZI coded, the recovered NRZI encoded digitized analog signal 65 is transferred to a data decoder 70. The data decoder 70 has NRZI decoder to recover the NRZI encoded compressed digitized analog signal. The data decoder 70 additionally has a bit extractor to remove the extra bits added to the compressed digitized data to ensure the correct number of transitions in the compressed digitized analog signal. A frame extractor removes the synchronization pattern words added at the beginning of each packet of the compressed digitized data and the end-of-frame pattern words added at the end of each frame. This reproduces the original MP-3 compressed digitized analog signal 75 that is transferred to the MP-3 decoder 80.

The MP-3 decoder expands the compressed digitized analog signal to a reproduction of the original digitized analog signal. The reproduction of the original digitized analog signal is the input to the analog-to-digital converter, as described above and a reproduction the original analog output is transferred to external circuitry.

Figure 3:
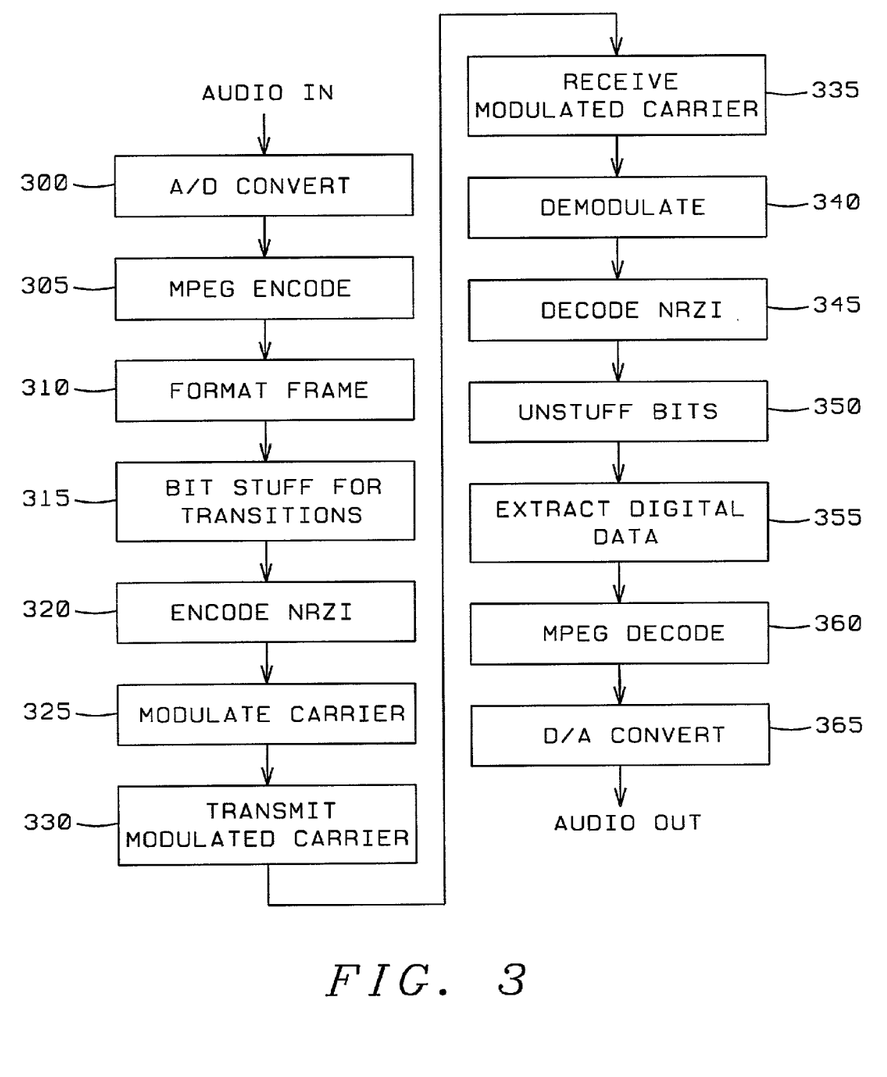
FIG. 3 is flow chart of the method for transmission of an analog audio signal of this invention.
Figure 4:
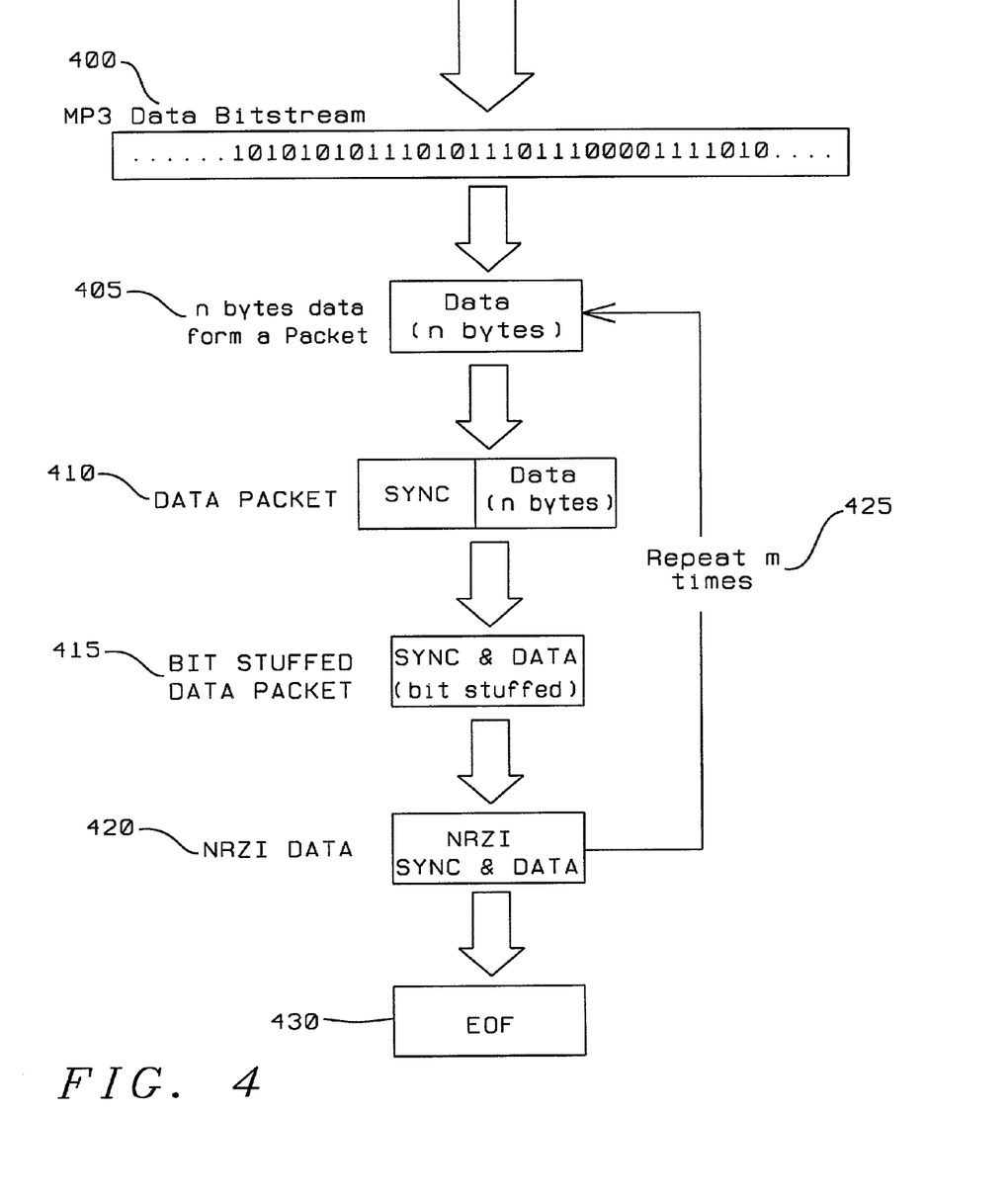
FIG. 4 is a flow diagram of the construction of the transmitted data structure of the compressed digitized analog signal of this invention.
Figure 5:
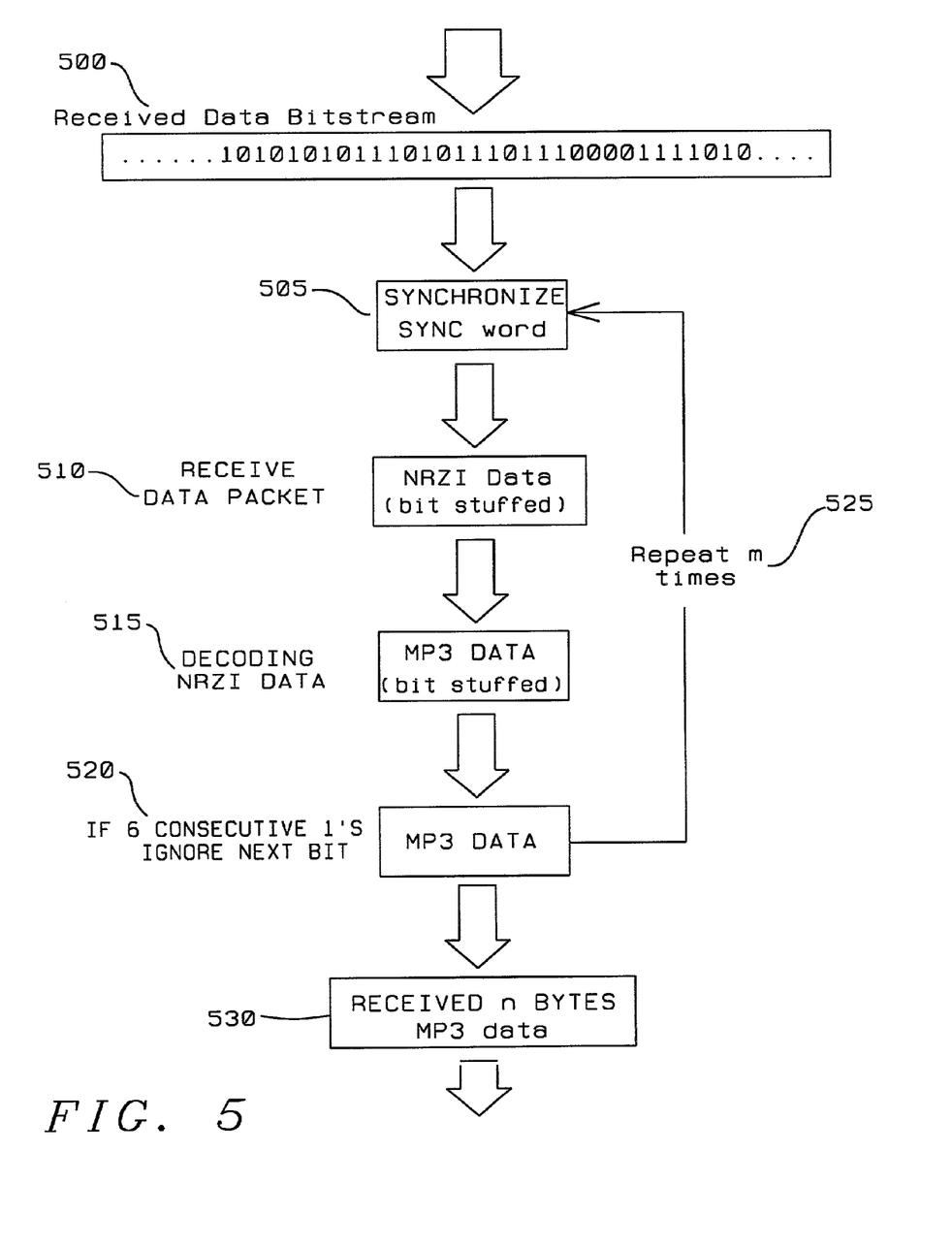
FIG. 5 is flow diagram of the extraction from the received data structure to reproduce the compressed digitized analog signal of this invention.

Refer now to FIGS. 3, 4, and 5 for a discussion of the method of transmission and reception of an analog audio signal. The audio signal is sampled periodically and converted to a digital value indicating the magnitude of the audio signal (step 300). The digitized audio signal is then compressed (step 305) according to the MP-3 algorithm to form an MP-3 encoded bit stream. The MP-3 encoded bit stream is then formatted (step 310) into frames. The frame is formed by dividing MP-3 encoded bit stream into packets as shown in FIG. 2. A synchronization word (0000 0001) is placed at the beginning of each packet. Sixteen of the packets are then formed into a frame with an end-of-frame word (0101 0101) placed at the end of each frame. As described above, if there are too few transitions within a frame, extra bits must be stuffed into the frame to insure accurate recovery of the MP-3 encoded data. At step 315, the extra bits are inserted into the frames of the MP-3 encoded data. To provide an optimum frequency content of the MP-3 encoded data, the MP-3 encoded data is further encoded (step 320) to an NRZI format. The NRZI formatting is as described in FIG. 6.

Refer now to FIG. 4 for a further discussion of the frame formatting (step 310), bit-stuffing (step 315), and NRZI encoding (step 320). The MP-3 encoded bit stream is provided (step 400). A number (n) of bytes of the MP-3 encoded bit stream are selected (step 405) and a synchronization word is inserted (step 410) at the beginning of the packet. To ensure the proper number of transitions within each packet, each packet has bits inserted into each packet, as described in FIG. 7. Each packet is then encoded (step 420) in the NRZI coding. The forming (steps 405–420) of the packets is repeated for a number of times (m) (step 425) to form a frame. At the completion of the formation of the frame the end-of-frame word is appended (step 230) in the NRZI format at the end of each frame.

Returning to FIG. 3, an RF carrier signal is then modulated (step 325) by the NRZI coded frame of the MP-3 encoded bit stream and transmitted (step 330) as an electromagnetic wave through the atmosphere. The electromagnetic wave is received and the modulated RF carrier signal is then recovered (step 335). The received RF carrier signal is then demodulated (step 340) to reproduce the NRZI coded frame of the MP-3 encoded bit stream. The NRZI coded frame of the MP-3 encoded bit stream is then decoded (step 345) to recover the frame of the MP-3 encoded bit stream. The extra bits inserted to ensure the proper number of transitions are removed (step 350) from the frame of the MP-3 encoded data. The synchronization words are removed from each packet and the end-of-frame word is removed from each frame to extract (step 355) the MP-3 encoded bit stream. The MP-3 encoded bit stream is decoded according to an MP-3 algorithm (step 360) to decompress the MP-3 encoded bit stream to reproduce a copy of the original digitized audio signal. The copy of the original digitized audio signal is the reconverted (step 365) to an analog signal that is substantially equivalent to the original analog audio signal.

Referring now to FIG. 5 for a discussion of the decoding (step 345) of the NRZI coded frame of the MP-3 encoded bit stream, the removal (step 350) of the inserted bits, and extraction (step 355) of the MP-3 encoded bit stream. A received bit stream of the demodulated RF carrier is provided (step 500). The synchronization word is detected (step 505) and the packet is extracted (step 510). The packet is then decoded to convert the NRZI coded packet to the MP3 encoded bit stream (step 515. If the bit stream has six consecutive bits of one logic level (ones in this embodiment), the following bit is ignored (step 520) as shown in FIG. 7. The packet of bytes (n bytes) of the MP3 encoded data is then recovered (step 520). This process (steps 505–530) is repeated for a number (m) of times to complete a frame. The end-of-frame word is removed and the MP-3 encoded data is restored.

Presently, the MP-3 encoding/decoding ASIC's provide an inexpensive method of compressing and decompressing digitized analog signals to limit the bandwidth of their transmission. Further, the transmitters and receivers that operate in the unlicensed RF bands greater than 900 MHz are also cost effective communication devices. The combination of the MP-3 encoding/decoding ASIC's and the 900 MHz RF transmitters and receivers allow implementation of the transmission and reception system as described in the present invention.

While this invention has been particularly shown and described with reference to the preferred embodiments thereof, it will be understood by those skilled in the art that various changes in form and details may be made without departing from the spirit and scope of the invention.

The invention claimed is:

1. A wireless audio transmission and reception system comprising
   a first encoder to receive an analog signal, to digitize said analog signal, and to compress the digitized analog signal using MP-3 compression;
   a frame formatter in communication with the first encoder to divide the compressed digitized analog signal into packets, placing synchronization patterns at a beginning of each packet assembling a number of packets into a frame; and placing an end-of-frame pattern at an end of said frame;
   a bit-stuffing circuit in communication with the frame formatter to insert bits into any frame having insufficient transitions, whereby said insufficient transitions cause errors in receiving the compressed digitized analog signal;
   a demodulator in communication with said bit stuffing circuit to synchronize and extract the compressed digitized analog signal from a carrier signal modulated with said compressed digitized analog signal;
   a frame remover in communication with the demodulator to remove synchronization patterns from a beginning of each packet of the compressed digitized analog signals and end-of-frame patterns from an end of each frame of packets of the compressed digitized analog signals; and
   a bit-extractor circuit in communication with said frame remover to remove bits inserted into the compressed digitized analog signal to restore original transitions of the compressed digitized analog signal.

2. The system of claim 1 further comprising a second encoder in communication with said first encoder to encode the frames of the compressed digitized analog signal to a non-return-to-zero invert-on-zeros (NRZI) coding.

3. The system of claim 1 further comprising a second decoder placed in communication with the demodulator and the to restore a NRZI encoded, compressed digitized analog signal to the compressed digitized analog signal.

4. The system of claim 1 wherein the carrier frequency is at least 900 MHz.

5. The system of claim 1 wherein a compression ratio of the digitized analog signal to the compressed digitized analog signal is from approximately 8:1 to approximately 96:1 and is determined by a quality of audio reproduction of the analog signal.

6. A wireless audio transmitter system comprising
   a first encoder to receive an analog signal, to digitize said analog signal, and to compress the digitized analog signal using MP-3 compression;
   a frame formatter in communication with the first encoder to divide the compressed digitized analog signal into packets placing synchronization patterns at a beginning of each packet, assembling a number of the packets to form a frame and placing an end-of-frame pattern at an end of said frame;
   a bit-stuffing circuit in communication with the frame formatter to insert bits into any frame having insufficient transitions whereby said insufficient transitions cause errors in receiving the compressed digitized analog signal.

7. The system of claim 6 further comprising a second encoder to encode the frames of the compressed digitized analog signal to a non-return-to-zero invert-on-zeros (NRZI) coding.

8. The system of claim 6 wherein the carrier frequency is at least 900 MHz.

9. The system of claim 6 wherein a compression ratio of the digitized analog signal to the compressed digitized analog signal is from approximately 8:1 to approximately 96:1 and is determined by a quality of audio reproduction of the analog signal.

10. A wireless audio receiver system comprising
    a demodulator in communication with said bit stuffing circuit to synchronize and extract a compressed digitized analog signal from a carrier signal modulated with said compressed digitized analog signal;
    a frame remover in communication between the demodulator and the first decoder to remove synchronization patterns from a beginning of each packet of the compressed digitized analog signals and end-of-frame patterns from an end of a frame of packets of the compressed digitized analog signals; and
    a bit-extractor circuit in communication frame remover to remove bits inserted into the compressed digitized analog signal to restore original transitions of the compressed digitized analog signal.

11. The system of claim 10 further comprising a second decoder placed in communication the demodulator to restore a NRZI encoded, compressed digitized analog signal to the compressed digitized analog signal.

12. The system of claim 10 wherein the carrier frequency is at least 900 MHz.

13. The system of claim 10 wherein a compression ratio of the digitized analog signal to the compressed digitized analog signal is from approximately 8:1 to approximately 96:1 and is determined by a desired quality of audio reproduction of the analog signal.

14. A method for wireless transmission of an analog signal comprising the steps of:
    acquiring the analog signal;
    digitizing said analog signal;
    compressing the digitized analog signal according to an MP-3 encoding algorithm;
    forming frames of the compressed digitized analog signal by the steps of:
      assembling a plurality of bytes of the compressed digitized analog signal to create packets,
      placing a synchronization pattern at a beginning of each packet,
      assembling a plurality of said Packets to form frames, and
      placing an end-of-frame pattern at an end of each frame;
    inserting additional bits within any frame having insufficient transitions, whereby said insufficient transitions cause errors in receiving the compressed digitized analog signal;
    demodulating a carrier signal modulated with said compressed digitized analog signal to extracted the compressed digitized analog signal;
    removing frames from the compressed digitized analog signal by:

removing synchronization patterns from a beginning of each packet, and removing an end-of-frame pattern from each from an end of each frame; and extracting bits inserted to the compressed digitized analog signal to restore original transitions of the compressed digitized analog signal.

15. The method of claim 14 further comprising the step of:
encoding the compressed digitized analog signal to an NRZI format.

16. The method of claim 14 further comprising the step of:
decoding an NRZI encoded, compressed, and digitized analog signal to restore the compressed digitized analog signal.

17. The method of claim 14 wherein the carrier signal is at least 900 MHz.

18. The method of claim 14 wherein a compression ratio of the digitized analog signal to the compressed digitized analog signal is from approximately 8:1 to approximately 96:1 and is determined by a desired quality of audio reproduction of the analog signal.

19. The system of claim 1 further comprising a modulator in communication with the first encoder to receive the compressed digitized analog signal and to modulate a carrier frequency with the compressed digitized analog signal.

20. The system of claim 19 further comprising
a transmitter in communication with the modulator to transfer the modulated carrier signal wirelessly; and a receiver to receive the wirelessly transmitted modulated carrier signal.

21. The system of claim 1 further comprising a first decoder in communication with the bit extractor to decompress the compressed digitized analog signal using MP-3 decompression and to convert said digitized analog signal to a reproduction of the analog signal.

22. The system of claim 6 further comprising:

a modulator in communication with the first encoder to receive the compressed digitized analog signal and to modulate a carrier frequency with the compressed digitized analog signal; and a transmitter in communication with the modulator to transfer the modulated carrier signal wirelessly.

23. The system of claim 10 further comprising a receiver to receive a wirelessly transmitted modulated carrier signal.

24. The system of claim 10 further comprising a first decoder in communication with the demodulator to decompress the compressed digitized analog signal using MP-3 decompression and to convert said digitized analog signal to a reproduction of an analog signal.

25. The method of claim 14 further comprising the step of:

decompressing the compressed digitized analog signal according to an MP-3 decoding algorithm; and converting the digitized analog signal to a reproduced analog signal.

* * * * *

UNITED STATES PATENT AND TRADEMARK OFFICE
CERTIFICATE OF CORRECTION

PATENT NO. : 6,993,283 B1  
DATED : January 31, 2006  
INVENTOR(S) : Ka Ming Wu and Yan Kwan So

Page 1 of 1

It is certified that error appears in the above-identified patent and that said Letters Patent is hereby corrected as shown below:

Title page,
Item [75], Inventors, delete "Wu Ka Ming, Hong Kong (HK); So Yan Kwan, Hong Kong (HK)" and replace with -- Ka Ming Wu, Hong Kong, (HK); Yan Kwan So, Hong Kong, (HK) --.

Signed and Sealed this

Sixth Day of June, 2006

JON W. DUDAS
*Director of the United States Patent and Trademark Office*